United States Patent [19]

Kubo et al.

[11] 4,452,951

[45] Jun. 5, 1984

[54] PROCESS FOR HYDROGENATING CONJUGATED DIENE POLYMERS

[75] Inventors: Yoichiro Kubo, Yokohama; Kiyomori Oura, Kamakura, both of Japan

[73] Assignee: Nippon Zeon Co. Ltd., Tokyo, Japan

[21] Appl. No.: 399,276

[22] Filed: Jul. 19, 1982

[30] Foreign Application Priority Data

Jul. 24, 1981 [JP] Japan ............................ 56-116250

[51] Int. Cl.$^3$ .......................................... C08F 8/04
[52] U.S. Cl. .................................. 525/339; 525/329.3
[58] Field of Search .............................. 525/339, 338

[56] References Cited

U.S. PATENT DOCUMENTS

Re. 27,145  6/1971  Jones ................................. 525/339
2,585,583   2/1952  Pinkney .............................. 525/339
2,844,573   7/1958  Gluesenkamp et al. ............ 525/339
2,864,809  12/1958  Jones et al. ........................ 525/339
3,809,687   5/1974  Allison, Jr. et al. ................ 525/339
4,337,329   6/1982  Kubo et al. ........................ 525/339
4,384,081   5/1983  Kubo et al. ........................ 525/339

Primary Examiner—Joseph L. Schofer
Assistant Examiner—Bernard Lipman
Attorney, Agent, or Firm—Sherman & Shalloway

[57] ABSTRACT

In a process for hydrogenating a conjugated diene polymer which comprises hydrogenating the carbon-carbon double bonds of the conjugated diene polymer using a hydrogenation catalyst supported on a carrier, the improvement wherein the carrier is porous silica having an average pore diameter of from 80 to 1,200 Å and a specific surface area of not more than 600 m$^2$/g.

11 Claims, No Drawings

PROCESS FOR HYDROGENATING CONJUGATED DIENE POLYMERS

This invention relates to a process for hydrogenating a conjugated diene polymer. More specifically, it relates to a process for hydrogenating a conjugated diene polymer in the presence of a hydrogenation catalyst supported on a specified silica carrier.

Various metals or non-metals have been known as catalysts for hydrogenation, and those which are generally in use include metals of Group VIII of the periodic table, particularly iron, cobalt, nickel, ruthenium, rhodium, palladium, osmium, iridium, and platinum. In many cases, these catalysts are supported on porous carriers such as carbon, alumina, silica, silica-alumina, and diatomaceous earth.

In hydrogenation, the hydrogenating activities of these carrier-supported catalysts depend greatly on the form of the carriers. The hydrogenating activity decreases when the particle diameter of the carriers is large, and increases when it is small. In order, therefore, to increase the activity of these hydrogenation catalysts, it is necessary to decrease the diameter of the carrier particles. This, however, makes it difficult to separate the catalyst from the hydrogenation product after hydrogenation. The separation becomes more difficult in the case of polymer hydrogenation, because unlike the case of hydrogenating low-molecular-weight compounds, the reaction mixture has a high viscosity. In short, the hydrogenating activity and separability of a carrier-supported hydrogenation catalyst are influenced to a large extent by its overall particle size, and the expected effects of these are, in many cases, inconsistent with each other. Thus, when, for example, carbon having a small particle diameter is used as a carrier, it is now common practice to granulate the carrier by a special method so as to improve the separability of the catalyst without degrading its hydrogenating activity, or to withdraw the resulting hydrogenated polymer without separating the carrier-supported catalyst therefrom.

It is an object of this invention therefore to provide a process for producing a hydrogenated conjugated diene polymer by using a supported catalyst which has high activity and can be easily separated from a highly viscous solution containing the hydrogenated polymer after hydrogenation.

According to this invention, this object is achieved by a process for hydrogenating a conjugated diene polymer, which is characterized by using porous silica having a specific surface area of not more than 600 m$^2$/g and an average pore diameter of from 80 to 1,200 Å as a carrier for supporting a hydrogenation catalyst.

The silica used in the process of the invention is powdery, granular or molded silica having a specific surface area of not more than 600 m$^2$/g, preferably not more than 500 m$^2$/g, and an average pore diameter of from 80 to 1,200 Å, preferably from 100 to 1,000 Å. Silica having a specific surface area exceeding 600 m$^2$/g contains a number of small pores which do not show activity in the hydrogenation of a polymer, and therefore, a catalyst supported on it has a low hydrogenating activity per unit weight of the catalyst. Silica having an average pore diameter of less than 80 Å has low hydrogenating activity in the hydrogenation of a polymer having a large volume. Silica having an average pore diameter exceeding 1,200 Å has satisfactory hydrogenating activity, but since large pores exist in it, its strength is reduced so that it is broken during hydrogenation or catalyst separation and the separation of the catalyst becomes difficult. In view of hydrogenating activity and separability after hydrogenation, silica having a particle diameter in the range of from 0.01 to 5 mm is preferred. If its particle diameter is less than 0.01 mm, the catalyst is difficult to separate from a solution of the resulting hydrogenated polymer. If, on the other hand, its particle diameter exceeds 5 mm, the catalyst can be well separated, but its activity is markedly reduced. Silica having a particle diameter of 0.1 to 2 mm is especially preferred. So long as the silica used in the invention is within the above-specified ranges, there is no particular other limitation to be imposed on it. It includes, for example, silica gels used for humidity control, moisture-proofing, gas chromatography, thin-layer chromatography, column chromatography, and liquid chromatography. It may be powdery, spherical, or molded.

In the hydrogenation of conjugated diene polymers with supported catalysts, diatomaceous earth, silica-alumina, alumina, activated carbon, etc. have previously been used as carriers. When diatomaceous earth is used, the catalysts have very low hydrogenating activity. When silica-alumina or alumina is used and an acrylonitrile/butadiene copolymer is used as the conjugated diene polymer, the nitrile group of the polymer is reduced and the selectivity of hydrogenation is reduced. With activated carbon, hydrogenating activity can be obtained, but it is very difficult to separate the catalysts by filtration after the reaction.

In contrast, the above problems can be solved by using the specified silica in accordance with this invention, and there can be obtained a supported catalyst for the hydrogenation of conjugated diene polymers, which has high hydrogenating activity, high selectivity, and good separability.

The hydrogenation catalyst used in this invention may be any one of metallic or non-metallic catalysts which have hydrogenating ability. Specific examples of the metallic catalysts are Fe, Co, Ni, Ru, Rh, Pd, Ir, Os, Pt, Cr, Mn, Ti, V, Zr, Mo, and W. Specific examples of the non-metallic catalysts are Te and As. These metals or non-metals may be used singly or in combination.

Such a metal or non-metal can be deposited on the silica carrier by usual methods of preparing supported catalysts. For example, silica-supported catalysts can be obtained by depositing the metal or non-metal as such on the silica carrier, or by impregnating the silica carrier with an aqueous solution of a salt of the metal or non-metal and then subjecting the impregnated silica carrier to a reducing treatment.

The amount of the catalyst deposited on the silica carrier is usually 0.001 to 30% by weight, preferably 0.01 to 10% by weight, based on the carrier.

The conjugated diene polymer used in this invention is a polymer or copolymer derived from 10 to 100% by weight of a conjugated diene monomer and 90 to 0% by weight of an ethylenically unsaturated monomer. Examples of the conjugated diene monomer are 1,3-butadiene, 2,3-dimethylbutadiene, isoprene and 1,3-pentadiene. Examples of the ethylenically unsaturated monomer include unsaturated nitriles such as acrylonitrile and methacrylonitrile; monovinylidene aromatic hydrocarbons such as styrene and alkylstyrenes (e.g., o-, m- and p-methylstyrene or ethylstyrene); unsaturated carboxylic acids or their esters, such as acrylic acid, methacrylic acid, crotonic acid, itaconic acid, maleic acid, methyl acrylate, ethyl acrylate, butyl acrylate, 2-ethylhexyl acrylate and methyl methacrylate; vinylpyridine; and vinyl esters such as vinyl acetate. The conjugated diene polymer is produced by a known method such as solution polymerization or emulsion polymerization. Typical examples of the conjugated diene polymer are polybutadiene, polyisoprene, butadiene/styrene (random or block) copolymer, acrylonitrile/butadiene (random or alternating) copolymer, The acrylonitrile/butadiene copolymer is especially suitable for use in this invention.

The hydrogenating reaction is carried out by using a solution of the polymer obtained by solution polymerization, or by using a solution of a solid polymer in a solvent. The concentration of the polymer in the solution is 1 to 70% by weight, preferably 1 to 40% by weight. Any solvent can be used which does not adversely affect the catalyst and can dissolve the polymer to be hydrogenated. Examples include benzene, toluene, xylene, hexane, cyclohexane, tetrahydrofuran, acetone, methyl ethyl ketone, ethyl acetate and cyclohexane.

The reaction temperature is 0° to 300° C., preferably 20° to 150° C. At a temperature of more than 150° C., side-reactions may take place. For example, the solvent is hydrogenated, or the ethylenically unsaturated monomer unit in the polymer (e.g., the nitrile group of acrylonitrile, or the benzene ring of styrene) is hydrogenated.

The pressure of hydrogen is from atmospheric pressure to 300 kg/cm$^2$, preferably 5 to 200 kg/cm$^2$. Pressures higher than 300 kg/cm$^2$ are not practical because the cost of equipment will increase and the handling of the autoclave is troublesome.

After hydrogenation, the carrier-supported catalyst is separated from the solution of the hydrogenated polymer by conventional methods such as precipitation, centrifugal separation or filtration. The hydrogenated polymer is then separated from the solution by usual methods for recovering a polymer from a polymer solution. For example, this separation is effected by a steam precipitation method which comprises contacting the polymer solution directly with steam, a drum drying method which comprises dropping the polymer solution onto a heated rotating drum to evaporate the solvent, or a method which comprises adding a non-solvent to the polymer solution to precipitate the polymer. The hydrogenated polymer so separated from the solution is then subjected to a drying step involving water removal, hot air drying, vacuum drying or extrusion drying, and then recovered as a solid product.

The resulting hydrogenated conjugated diene polymer can be used in a wide range of applications because of its excellent weatherability, ozone resistance, thermal stability and cold resistance.

The following examples illustrate the present invention more specifically. It should be understood that the invention is not limited to these examples.

The various properties given in these examples were measured by the following methods.

The average particle diameter of silica was determined from a particle diameter distribution curve prepared on the basis of its optical or electron microphotograph.

The specific surface area of silica was calculated by the BET method from the amount of nitrogen absorption measured by a low-temperature nitrogen adsorption method.

The average pore diameter and pore volume of silica were measured by using a mercury porosimeter.

The degree of hydrogenation of the carbon-carbon double bonds was measured by an iodine value method.

EXAMPLE 1

From commercially available silica ("Silicagel 100", a product of Wako Pure Chemical Industries, Ltd.) having a specific surface area of 400 m$^2$/g, a pore volume of 1.0 ml/g, and an average pore diameter of 100 Å, unwanted components were removed by classification to prepare silica having an average particle diameter of 0.15 mm as a carrier. The silica carrier was dipped in an aqueous solution of PdCl$_4$, and then treated with formalin-sodium hydroxide to give a catalyst having 1% by weight of Pd deposited thereon (catalyst No. 1).

A 100 ml. autoclave was charged with 51 g of acetone and 9 g of acrylonitrile/butadiene copolymer (to be abbreviated NBR; the amount of bonded acrylonitrile 39.4% by weight, ML$_{1+4}$, 100° C.=53). Then, 0.45 g (5 parts by weight per 100 parts by weight of polymer) of the supported catalyst was charged into the autoclave. The inside of the autoclave was substituted by nitrogen, and then the reaction was carried out at a hydrogen pressure of 50 kg/cm$^2$ and a temperature of 50° C. for 5 hours.

The results are shown in Table 1.

EXAMPLE 2

From commercially available silica (Grade 952, a product of Fuji-Davison Co., Ltd.) having a specific surface area of 350 m$^2$/g, a pore volume of 1.7 ml/g and an average pore diameter of 200 Å, unwanted components were removed by classification to prepare silica having an average particle diameter of 0.15 mm as a carrier. A catalyst was prepared in the same way as in Example 1 using the resulting silica carrier (catalyst No. 2). The same NBR as used in Example 1 was hydrogenated by using the resulting catalyst.

A solution of each of polybutadiene (to be abbreviated BR; cis-1,4 content 98%, ML$_{1+4}$, 100° C.=40), polyisoprene (to be abbreviated IR; cis-1,4 content 98%, ML$_{1+4}$, 100° C.=80) and styrene/butadiene copolymer (to be abbreviated SBR; styrene content 23.5% by weight, ML$_{1+4}$, 100° C.=50) in cyclohexane in a concentration of 10% by weight was charged into the same autoclave as used above, and was reacted at a hydrogen pressure of 60 kg/cm$^2$ and a temperature of 90° C. by using 7 parts by weight of the catalyst No. 2 per 100 parts by weight of the polymer.

The results are shown in Table 1.

EXAMPLE 3

From commercially available silica (Macroporous 500, a product of Merck & Co.) having a specific surface area of 65 m$^2$/g, a pore volume of 0.92 ml/g and an average pore diameter of 430 Å, unwanted components were removed by classification to prepare silica having an average particle diameter of 0.15 mm as a carrier. A catalyst was prepared in the same way as in Example 1 by using the silica carrier (catalyst No. 3). A catalyst having deposited thereon Rh instead of Pd was also prepared in the same way (catalyst No. 4). By using these catalysts, the same NBR as used in Example 1 was hydrogenated under the same conditions as in Example 1.

A solution of each of BR, IR and SBR in cyclohexane in a concentration of 10% by weight was charged into the same autoclave as used above, and reacted at a temperature of 90° C. and a hydrogen pressure of 60 kg/cm² for 3 hours by using 7 parts by weight of the catalyst No. 3 per 100 parts by weight of the polymer.

EXAMPLE 4

From commercially available silica (Macroporous 100, a product of Merck & Co.) having a specific surface area of 25 m²/g, a pore volume of 1.30 ml/g and an average pore diameter of 1100 Å, unwanted components were removed by classification to prepare silica having an average particle diameter of 0.15 mm as a carrier. A catalyst was prepared in the same way as in Example 1 by using the resulting silica carrier (catalyst No. 5). By using this catalyst, the same NBR as used in Example 1 was hydrogenated in the same way as in Example 1.

A solution of each of BR, IR and SBR in cyclohexane in a concentration of 10% by weight was charged into the same autoclave as used above, and reacted at a hydrogen pressure of 60 kg/cm² and a temperature of 90° C. for 3 hours by using 7 parts by weight of the catalyst No. 5 per 100 parts by weight of the polymer.

The results are shown in Table 1.

COMPARATIVE EXAMPLE 1

From commercially available silica (Silicagel 40, a product of Wako Pure Chemical Industries Ltd.) having a specific surface area of 650 m²/g, a pore volume of 0.55 ml/g and an average pore diameter of 40 Å, unwanted components were removed by classification to prepare silica having an average particle diameter of 0.15 mm as a carrier. A catalyst was prepared in the same way as in Example 1 by using the resulting silica carrier (catalyst No. 6). A catalyst having deposited thereon Rh instead of Pd was prepared in the same way as in Example 1 using the above silica carrier (catalyst No. 7). By using these catalysts, the same NBR as used in Example 1 was hydrogenated under the same conditions as in Example 1.

Each of BR, IR and SBR was hydrogenated in the presence of the catalyst No. 6 under the same conditions as in Example 4.

The results are shown in Table 1.

COMPARATIVE EXAMPLE 2

From commercially available activated carbon (Shirasagi A, a product of Takeda Chemical Co., Ltd.; specific surface area of 1,300 m²/g), unwanted components were removed by classification to prepare activated carbon having an average particle diameter of 0.05 mm as a carrier. By using the carbon carrier, a catalyst was prepared in the same way as in Example 1 (catalyst No. 8). By using this catalyst, the same NBR as used in Example 1 was hydrogenated in the same way as in Example 1.

The results are shown in Table 1.

COMPARATIVE EXAMPLE 3

From commercially available alumina (X610R, a product of Nikki Chemical Co., Ltd.; specific surface area 310 m²/g, pore volume 0.4 ml/g, average pore diameter 300 Å), unwanted components were removed by classification to prepare alumina having an average particle diameter of 0.02 mm as a carrier. A catalyst was prepared in the same way as in Example 1 by using this carrier (catalyst No. 9). By using the catalyst No. 9, the same NBR as used in Example 1 was hydrogenated in the same way as in Example 1.

The results are shown in Table 1.

TABLE 1

| | | Ex. 1 | Ex. 2 | Ex. 3 | Ex. 4 | CEx. 1 | | CEx. 2 | CEx. 3 | CEx. 4 |
|---|---|---|---|---|---|---|---|---|---|---|
| | Catalyst No. | 1 | 2 | 3 | 4 | 5 | 6 | 7 | 8 | 9 | 10 |
| Carrier | Type | Silicagel 100 | Grade 952 | Macroporous 500 | Macroporous 500 | Macroporous 100 | Silicagel 40 | Silicagel 40 | Activated carbon | Alumina X610R | Diatomaceous earth |
| | Specific surface area (m²/g) | 400 | 350 | 65 | 65 | 25 | 650 | 650 | 1300 | 310 | 20 |
| | Pore volume (ml/g) | 1.00 | 1.70 | 0.92 | 0.92 | 1.30 | 0.55 | 0.55 | — | 0.40 | — |
| | Average pore diameter (Å) | 100 | 200 | 430 | 430 | 1100 | 40 | 40 | — | 300 | — |
| | Average particle diameter (mm) | 0.15 | 0.15 | 0.15 | 0.15 | 0.15 | 0.15 | 0.15 | 0.05 | 0.02 | 0.15 |
| Catalytic metal | | Pd | Pd | Pd | Rh | Pd | Pd | Rh | Pd | Pd | Pd |
| Amount of the metal deposited (wt. %) | | 1 | 1 | 1 | 1 | 1 | 1 | 1 | 1 | 1 | 1 |
| Separability of the supported catalyst by filtration | | Good | Good | Good | Good | Good | Good | Good | No | Poor | Good |
| Hydrogenating activity | NBR Amount of the catalyst used (g/100 g polymer) | 5 | 5 | 5 | 5 | 5 | 5 | 5 | 5 | 5 | 5 |
| | Degree of hydrogenation (mole %) | 82.5 | 90.1 | 92.0 | 81.7 | 95.3 | 10.3 | 8.5 | 36.1 | 1.8 | 15.7 |
| | Reduction of the nitrile group | No | No | No | No | No | No | No | No | Yes | No |
| | BR Amount of the catalyst used (g/100 g polymer) | — | 7 | 7 | — | 7 | 7 | — | — | — | — |
| | Degree of hydrogenation (mole %) | — | 70.1 | 73.3 | — | 76.5 | 5.2 | — | — | — | — |
| | IR Amount of the catalyst used (g/100 g polymer) | — | 7 | 7 | — | 7 | 7 | — | — | — | — |
| | Degree of hydrogenation (mole %) | — | 38.7 | 41.3 | — | 46.0 | 2.8 | — | — | — | — |
| | SBR Amount of the catalyst used (g/100 g polymer) | — | 7 | 7 | — | 7 | 7 | — | — | — | — |
| | Degree of hydrogenation (mole %) | — | 45.4 | 49.9 | — | 53.4 | 3.5 | — | — | — | — |

Ex. = Example; CEx. = Comparative Example

The following conclusions can be drawn from the results given in Table 1.

The catalysts having the silica within the range specified in this invention as a carrier show high hydrogenating activity, particularly much higher hydrogenating activity than the catalyst having activated carbon in general use as a carrier.

The catalysts having the silica within the range specified in this invention can be separated by filtration after the reaction without adjusting their concentration. In contrast, the catalyst Nos. 6 and 7 having silica outside the above-specified range as a carrier shows high hydrogenating activity, but cannot be separated by filtration because its particle diameter is small.

The catalyst No. 8 having activated carbon as a carrier cannot be separated by filtration. Even when the reaction mixture is diluted with 5 times its amount of a solvent, blocking of the filter occurs.

The catalyst No. 9 having alumina as a carrier has an average pore diameter, a specific surface area and a particle diameter within the ranges specified in this invention, but has low activity. In addition, infrared absorption spectroscopy showed that in the hydrogenated polymer obtained by using this catalyst, an absorption at 3300–3500 cm$^{-1}$ assigned to the amino group was present. This means that the CN group at the side chain of the polymer was partly hydrogenated to —CNH and —CNH$_2$ groups.

The catalyst No. 10 having diatomaceous earth as a carrier has only very low hydrogenating activity.

What we claim is:

1. In a process for hydrogenating an acrylonitrile/butadiene copolymer which comprises hydrogenating the carbon-carbon double bonds of the copolymer using a platinum, palladium or ruthenium hydrogenation catalyst supported on a carrier, the improvement wherein the carrier is porous silica having an average pore diameter of from 80 to 1,200 Å and a specific surface area of not more than 600 m$^2$/g.

2. The process of claim 1 wherein the porous silica has an average pore diameter of from 100 to 1,000 Å.

3. The process of claim 1 or 2 wherein the porous silica has a specific surface area of not more than 500 m$^2$/g.

4. The process of claim 1 or 2 wherein the porous silica has a particle diameter of from 0.01 to 5 mm.

5. The process of claim 3 wherein the porous silica has a particle diameter of from 0.01 to 5 mm.

6. The process of claim 1 or 2 wherein the porous silica has a particle diameter of from 0.1 to 2 mm.

7. The process of claim 3 wherein the porous silica has a particle diameter of from 0.1 to 2 mm.

8. The process of claim 1 wherein the amount of the hydrogenation catalyst supported on the carrier is from 0.01 to 10% by weight, based on the carrier.

9. The process of claim 1 wherein the porous silica carrier has an average pore diameter of from 100 to 430 Å and a specific surface area of from 65 to 400 m$^2$/g.

10. The process of claim 9 wherein the porous silica carrier has a pore volume of from about 0.92 to about 1.70 ml/g.

11. The process of claim 10 wherein the porous silica carrier has an average particle diameter of about 0.15 mm.

* * * * *